United States Patent [19]

Wende

[11] Patent Number: 4,797,109

[45] Date of Patent: Jan. 10, 1989

[54] COILED WIRE INTERCONNECTOR

[75] Inventor: Russell E. Wende, Oak Lawn, Ill.

[73] Assignee: Methode Electronics, Inc., Chicago, Ill.

[21] Appl. No.: 160,342

[22] Filed: Feb. 25, 1988

[51] Int. Cl.$^4$ ........................................... H01R 35/00
[52] U.S. Cl. .................................................... 439/15
[58] Field of Search ...................... 439/1, 4, 11, 13, 15

[56] References Cited

U.S. PATENT DOCUMENTS

| 4,502,746 | 3/1985 | Wawra et al. | 439/15 |
| 4,722,690 | 2/1988 | Priede | 439/15 |
| 4,735,573 | 4/1988 | Zeller et al. | 439/15 |

FOREIGN PATENT DOCUMENTS 0071875  2/1983  European Pat. Off. .............. 439/13

Primary Examiner—Gil Weidenfeld
Assistant Examiner—Gary F. Paumen
Attorney, Agent, or Firm—Charles F. Pigott, Jr.; Garrettson Ellis

[57] ABSTRACT

An electrical interconnector comprises an outer housing defining a first aperture; a rotor member occupying the first aperture in rotational relation to it; the first electrical connection carried on the outer housing; a second electrical connection carried on rotor member; and a coiled conductor wire loosely coiled in a plurality of coils about the rotor member with the outer housing, the coil conductor wire being connected at respective ends thereof to the first and second electrical connections. In this invention, one or more recesses are carried on either the outer housing or rotor member. One or more flexible detents are carried by the other of the outer housing and rotor, the detents being normally positioned to project into the recesses to prevent rotation between the outer housing and rotor member. The detents are positioned and proportioned so that mounting of the interconnector member for use on a steering column or the like causes the detents to be flexed out of projecting relation with the recesses, to permit rotation between the outer housing and rotor member.

17 Claims, 3 Drawing Sheets

COILED WIRE INTERCONNECTOR

BACKGROUND OF THE INVENTION

In Priede U.S. Pat. No. 4,722,690, entitled Clockspring Interconnector, an electrical interconnector member is provided, permitting electrical interconnection between, for example, an air bag assembly mounted on the steering column of a vehicle, and sensors mounted elsewhere in the vehicle. The sensors provide the electrical system with a signal that instantly activates the air bag in the event of a crash, causing the air bag to inflate to protect the car occupant.

Such an electrical interconnector member comprises an outer housing with a rotor member occupying an aperture in it in rotational relation thereto. First and second electrical connections are respectively placed on the outer housing and rotor, and connected by a coiled conducter which is loosely coiled around the rotor. By this means, the steering wheel may be rotated several turns in either direction without loss of electrical connection between members carried on the steering wheel such as the air bag assembly and the horn, and stationary members mounted elsewhere, such as the battery. Such a device is more reliable than an electrical brush and ring system, for example, which might fail, particularly during the impact of an accident.

As described in the Priede patent, it is important in mounting of the electrical interconnector member to be sure that the rotor is at a rotational center point relative to the housing as it is mounted onto the steering column. If the rotor is not centered, it may not be possible to turn the steering wheel of the car about its full range of travel from left to right without coming to an end of the ability of the interconnector to rotate without breaking the coil of the conductor. Thus, the interconnector must be installed on the steering column at a predetermined angular position, desirably its rotationally central position, so that the steering wheel may be rotated both to the left and the right in the full direction of travel. Typically, the interconnector may be capable of rotating two and one-half revolutions either clockwise or counterclockwise from the central position in which it is installed on the steering column while the wheels of the vehicle are straight.

The Priede patent discloses a breakaway member that prevents the rotor from rotating until it is mounted on the steering column. Thus, in the original manufacture of vehicles, the problem of orientation of the rotor relative to the housing is solved.

However, the problem of orientation of the rotor of an electrical interconnector of the coiled conductor type remains in the circumstance where repair work is done on the steering system and the interconnector is removed. There, the rotor may accidentally be rotated out of its rotationally central position. It is difficult to see from a quick inspection that such movement has taken place. Then, if such an interconnector is reinstalled onto the steering column, it may no longer coincide in its rotational capability with the complete range of rotational travel of the steering column. Thus, a small lack of adjustment of the interconnector when reinstalled may create major problems later on, when the finished vehicle is found to be incapable of its full range of steering, or upon attempt to steer the full range, the coiled conductor is broken, eliminating electrical interconnection with systems carried on the steering column.

In accordance with this invention, an electrical interconnector of the coiled conductor type is provided, in which the interconnector spontaneously locks when removed from its mounting on the steering column, or any other desired rotational member to which it is to be attached. Thus, the rotor can be expected to be rotationally immoveable until the time comes to reinstall it again on the steering column, at which time it becomes unlocked and capable once again of rotation.

DESCRIPTION OF THE INVENTION

In this invention, an electrical interconnector member comprises an outer housing defining a first aperture; a rotor member occupying the first aperture in rotational relation thereto; a first electrical connection carried on the outer housing; a second electrical connection carried on the rotor member; and coiled conductor means loosely coiled in a plurality of coils about the rotor member within the outer housing. The coiled conductor means is connected at respective ends to the first and second electrical connections.

In accordance with this invention, recess means are carried by one of the outer housing and rotor member. Flexible detent means are carried by the other of the outer housing and rotor member. The detent means are normally positioned to project into the recess means to inhibit rotation between the outer housing and rotor member. The detent means is also positioned and proportioned so that mounting of the interconnector member for use on a steering column or other structure causes the detent means to be flexed out of projecting relation with the recess means, to permit rotation between the outer housing and rotor member. Then, if the interconnector member is removed from its mounted position, the detent means flexes back again to its original, locked position to prevent rotation.

Typically, the rotor member defines a second aperture extending through it in generally coaxial relation with the first aperture. The recess means may be carried by the outer housing, and may comprise a plurality of recesses facing inwardly toward the rotor member. The flexible detent means, in this circumstance, may be carried on an end of the rotor member. When the interconnector is mounted for use, a portion of the vehicle steering column projects into the second aperture, while a flange carried on the steering column presses the detent means in longitudinal manner to hold the detent means in a radially inward position of engagement with the recess means, to permit rotation of the rotor member. Individual detents of the detent means may define finger members connected by a plastic hinge to the rotor. Each finger member may carry an integral spring extension member, which abuts against an inward face of the outer housing, so that the detent is normally urged by the spring extension member toward an outer position to engage the recess means. Typically, the engaging part of the detent member may be the spring extension member.

Alternatively, the detent means may be of generally U-shaped cross-section, comprising a pair of arm sections. One of the arm sections of the detent means may be attached to the rotor member, and the other of the arm sections may be biased by the resilience of the detent means to engage the recess means, to prevent rotation of the rotor member in the normally locked position. In mounted position, this embodiment, which is adapted to at least partly reside in an aperture in a steering column, has the sides of the aperture pressing the other arm inwardly out of engagement with the recess means, to permit rotation of the rotor.

In another embodiment, the interconnector may be adapted to receive a portion of a vehicle steering column in the second aperture as described above. The rotor member may carry first, hinged bar members in the first aperture. The rotor member also carries second, hinged bar members which are biased to engage at their outer ends the recess means of the outer housing, to prevent rotation of the rotor member. These recess means are preferably open to one side as well as inwardly, with the result that the steering column, when present, biases the first, hinged bar members to press the second, hinged bar members out of the open one side of each recess means and thus out of engagement therewith, to permit rotation between the housing and rotor member.

As a further alternative embodiment, the recess means may be carried on the outer housing, and may comprise a ring of recesses surrounding the rotor and facing in an axial direction. The flexible detent means may comprise a spring metal strip member residing in the second aperture. The strip member comprises an extension that extends out of the aperture and is normally biased into engagement with at least one of the recesses, to resist rotation between the outer housing and rotor member. The strip member also defines an inwardly extending loop section, whereby a steering column entering the second aperture, as defined above, may collapse the loop section, to cause axially outward movement of the extension, out of engagement with the recesses.

The coiled conductor means used in the interconnector of this invention may comprise a plurality of parallel conductor wires bonded together in a band of unitary, flexible insulation, with the wires positioned in coplanar relation. Thus, various different electrical circuits may be interconnected through the apparatus of this invention.

At least one end of the band of unitary, flexible insulation may define a slit in the insulation between two of the conductor wires and parallel thereto. The slit terminates short of the other end of the band, to form a pair of half-band portions joined together at one end. One half-band portion is folded to lie substantially on top of the other, and both portions are connected to means for providing electrical connection with the ends of the conductor wires. Thus, the width of the band of insulation may be reduced at its end to provide a desirable narrow width end connection.

It is also preferable for at least one end of the band of unitary insulation to carry a series of relatively thick members, the members being in relatively hinged relation to each other. As the result of this, one end of the band is flexible to form arcs of varying curvature, but it cannot be folded into a sharp, 180 degree fold, thus protecting the electrical conductors inside from breakage adjacent their connection sites.

By use of the above features, various designs of electrical interconnector members may be provided which exhibit a good, reliable rotational interconnection function, but which also lock when disconnected from mounting, to provide the advantages described above.

DESCRIPTION OF SPECIFIC EMBODIMENTS

Figure 1:
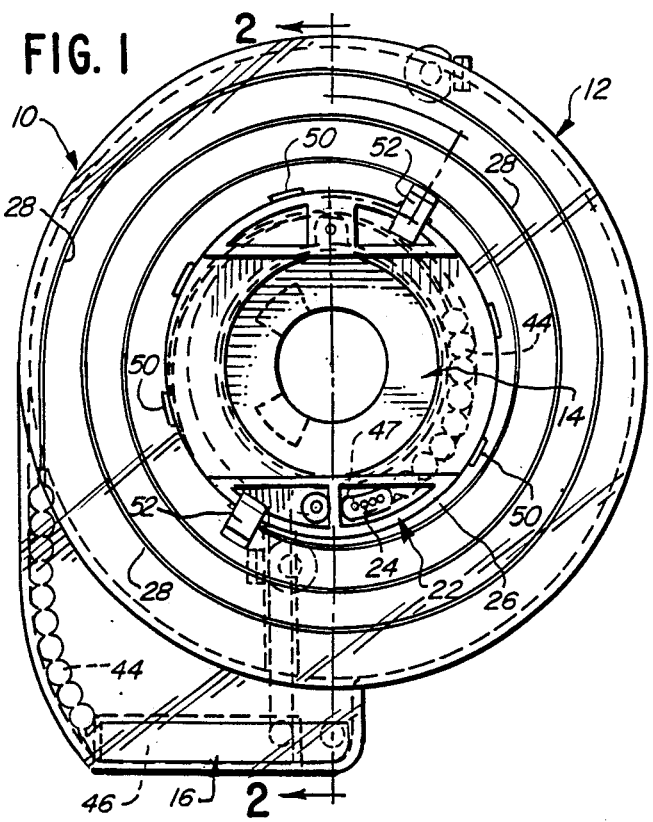
FIG. 1 is a plan view of one side of an electrical interconnector member in accordance with this invention.

Referring to FIGS. 1 through 5, an electrical interconnector member 10 is disclosed, comprising an outer housing 12 defining a first aperture which carries a rotor member 14, which is carried in rotational relation with outer housing 12.

Outer housing 12 carries a first electrical connection 16, including a transversely extending protective skirt 18 surrounding a plurality of electrical prongs 20 for connection with a connector.

Additionally, transversely outwardly extending wire or wires 21 are provided at first electrical connection 16.

A second electrical connection 22 is carried on rotor member 14, with connected transversely outwardly extending wires 24, being provided for desired connection to electrically operated members that are carried on a steering hub, for example, and rotate with rotor member 14. Second electrical connection 22 may also comprise an outwardly extending skirt member 26 to protect the connection sites of wires 24.

A coiled, flat, insulated, multi-wire conductor member 28 provides electrical connection between the first and second electrical connection sites 16, 22, with separate wires in the coiled, flat conductor providing independent, insulated electrical connection between individual pins 20 or wires 21 of first electrical connection 16 and the separate wires 24 of second electrical connection 22. Thus, the loosely coiled conductor member 28 makes possible the rotation of rotor 14 with respect to housing 12 for a desired number of rotations in either direction, without breaking the electrical interconnection provided by coiled conductor member 28. By this, electrically operated devices on the steering column of a vehicle, for example, may retain their electrical interconnection with stationary electrical members spaced from the steering column, while the vehicle may undergo the full range of steering either to the right or to the left on a continuing basis.

Figure 5A:
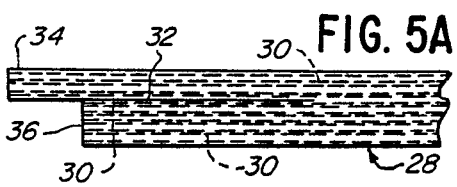
FIGS. 5a, 5b, and 5c show sequential steps in the processing of an end of the coiled conductor within the interconnector member, for connecting the coiled conductor to an electrical connection on the housing or the rotor.
Figure 5B:
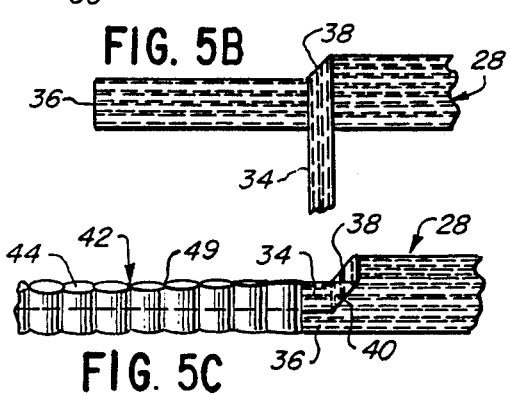
Figure 5C:
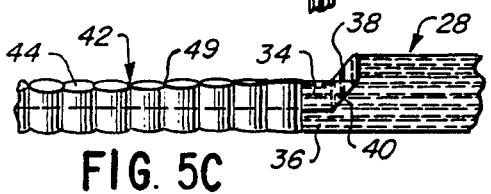

Referring to FIGS. 5a-c, one may provide electrical connection to each end of flat, coiled conductor wire 28 as shown. Conductor wire 28 contains, within insulation, separate, insulated metal wire conductors 30, each being separately connected at its ends as previously described to members 20, 21, or 24. By this invention, one may narrow the width of flat conductor 28 to accommodate a narrower width of interconnector member 10, while still providing connection with a large plurality of wire conductors, more than would normally fit in insulated manner into the reduced width of a strip. To accomplish this, as shown in FIG. 5a, one forms a slit 32 in the insulation between two of the conductor wires 30, the slit being parallel to the conductor wires and extending from one end of the insulated band 28 of conductor wires along the band and terminating well short of the other end thereof. If desired, a portion of one side of the slit band 28 may be cut away as shown in FIG. 5a, so that the two half-band portions 24, 36 may be of unequal length.

As shown in FIG. 5b, one then folds, about a first fold line 38, one of the half-band portions, specifically the portion 34 which is longer. This folding puts half-band portion 34 into substantially normal relation, and preferably perpendicular relation, with the other half-band portion 36.

Thereafter, one folds about a second fold line 40, as in FIG. 5c, the previously folded half-band portion 34, to bring most of said half-band portion 34 back toward parallel and overlying relation with the other half-band portion 36. The second fold line 40 will be closer to the free end of half-band portion 34 than first fold line 38. Second fold line 40 may be made in either direction of folding to accomplish similar purposes.

By this method, the band 28 of conductors has been narrowed in its width so that a portion of the band 34 overlies the other portion 36, without loss of electrical connection. Then, if desired, one may insert mold a portion of the half-band portions 34, 36 into a plastic connector mass 42, which comprises a series of relatively thick members 34 which are separated from each other by thin hinging portions 49, formed typically by thin or absent spots in the plastic injection molding around conductor band 28. As the result of this, each of the ends of conductor band 28 are flexible, being capable of forming arcs of varying curvature of a nature defined by the specific shape of plastic connector mass 42. Nevertheless, plastic connector mass 42 prevents the protected portions of band 28 from being folded into a sharp, 180 degree fold. Thus, as interconnector member 10 is rotated and handled, and as the coiled conductor band 28 coils and uncoils during operation, 180 degree folding of the ends adjacent their connections is eliminated, and mechanical weakening of the individual conductor wires 30 by flexing is reduced.

The individual conductor wires 30 then project into band heads 46,47 at opposite ends of conductor band 28, each of which respectively constitutes part of the first and second electrical connections previously discussed.

Further, in accordance with this invention, the electrical interconnector member carries lock means to prevent rotor 14 from rotating except when it is mounted on an appropriately shaped steering column 48 or the like. To accomplish this, outer housing 12 defines a plurality of recesses 50 facing rotor 14.

Figure 2:
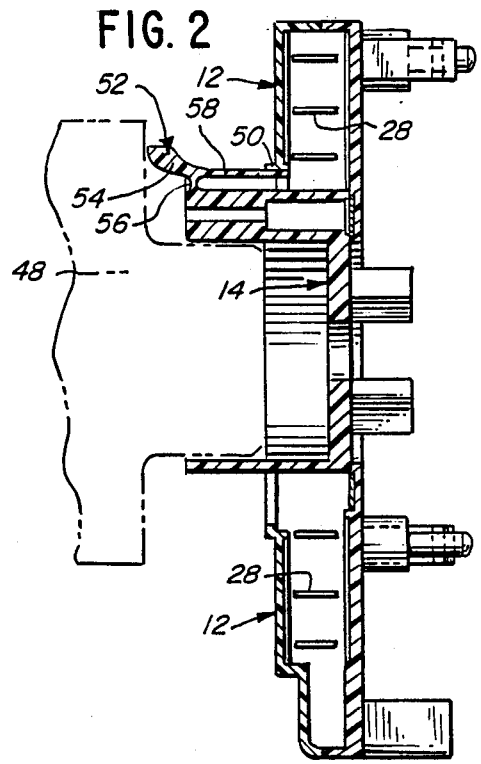
FIG. 2 is a sectional view taken along line 2—2 of FIG. 1.
Figure 4:
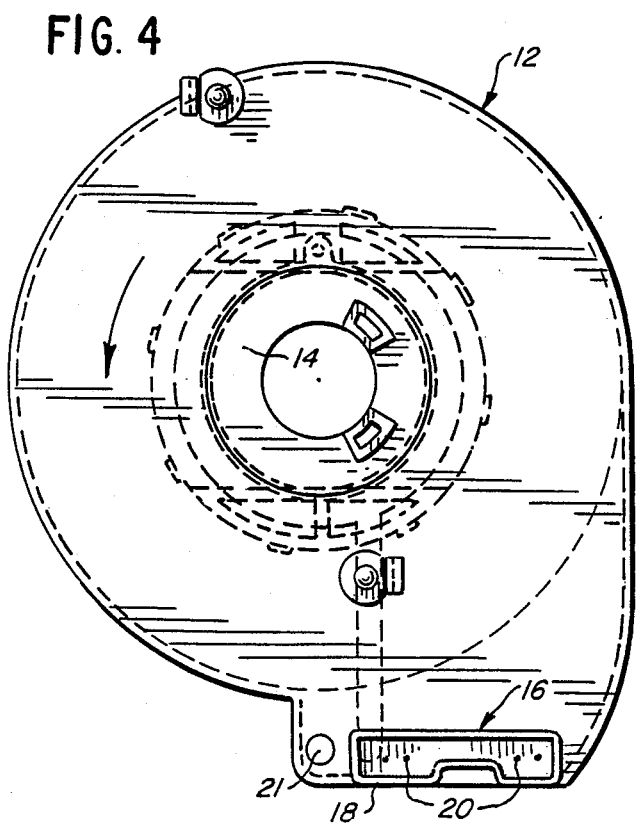
FIG. 4 is a plan view of the other side of the interconnector member of FIG. 1.

Rotor 14 carries a flexible, detent member 52. Detent member 52 defines a finger 54 connected to a plastic hinge 56 to rotor 14 as shown in FIG. 2. Finger member 54 carries an integral spring extension member 58 which abuts against an inward face of outer housing 12 and particularly is normally urged outwardly into engagement with a recess 50. Thus, while each spring extension member 58 resides within recess 50, rotor 14 cannot rotate with respect to housing 12. This is shown in FIG. 2, with steering column 48 not being in its final mounting position.

Figure 3:
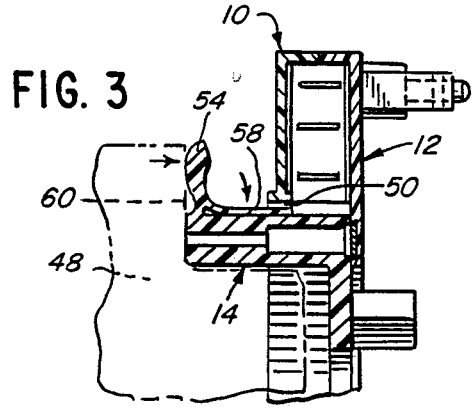
FIG. 3 is a fragmentary sectional view similar to FIG. 2, showing the interconnector in its operating position mounted on a steering shaft.

As shown in FIG. 3, when interconnector 10 is properly mounted on the end of steering column 48, flange 60 of steering column 48 longitudinally presses finger 54 outwardly as shown. The effect of this is to press spring extension member 58 inwardly, causing it to move out of recess 50. Thus, while interconnector remains mounted on steering column 48 in this manner, rotor 14 is able to freely rotate with steering column 48, while housing 12 is attached to the frame of the vehicle in stationary manner.

In the event that maintenance work must be performed, and interconnector 10 is removed from its position on steering column 48, the resilient memory of flexible detent 52 can cause finger 54 to retract back again inwardly toward its original position, and to cause spring extension member 58 to move outwardly again into engagement with its recess 50. Thus, upon removal from the steering column, interconnector 10 can once again be placed in a position where rotor 14 is non-rotatable with respect to housing 12.

Figure 6:
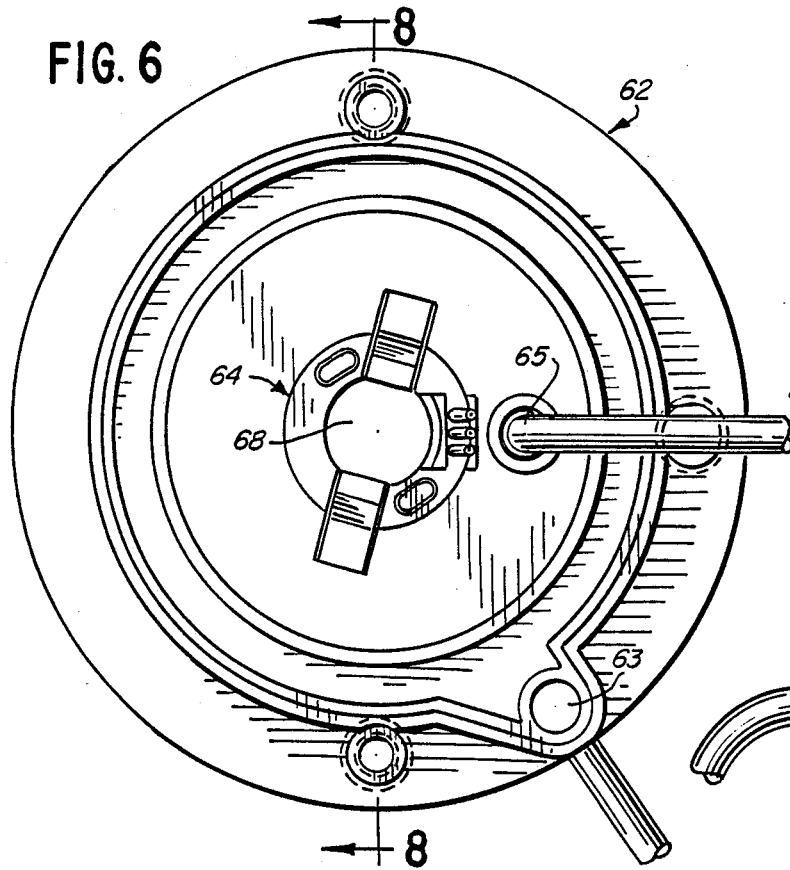
FIG. 6 is a plan view of one side of another embodiment of the electrical interconnector member in accordance with this invention.
Figure 8:
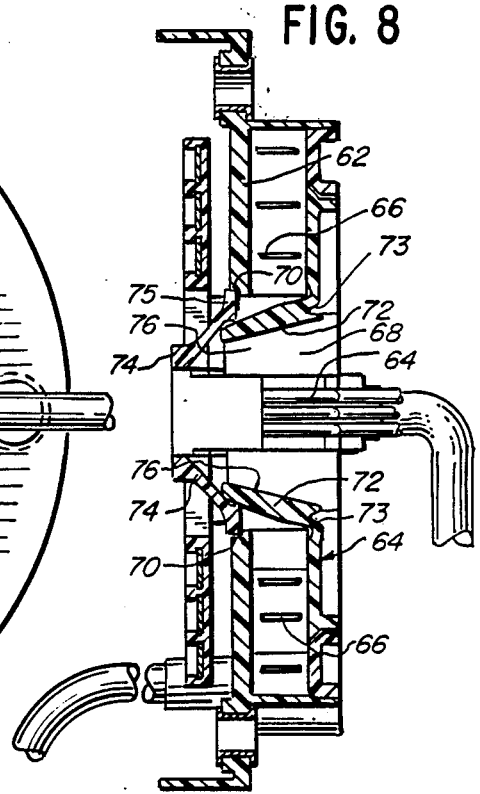
FIG. 8 is a sectional view taken along line 8—8 of FIG. 6.
Figure 7:
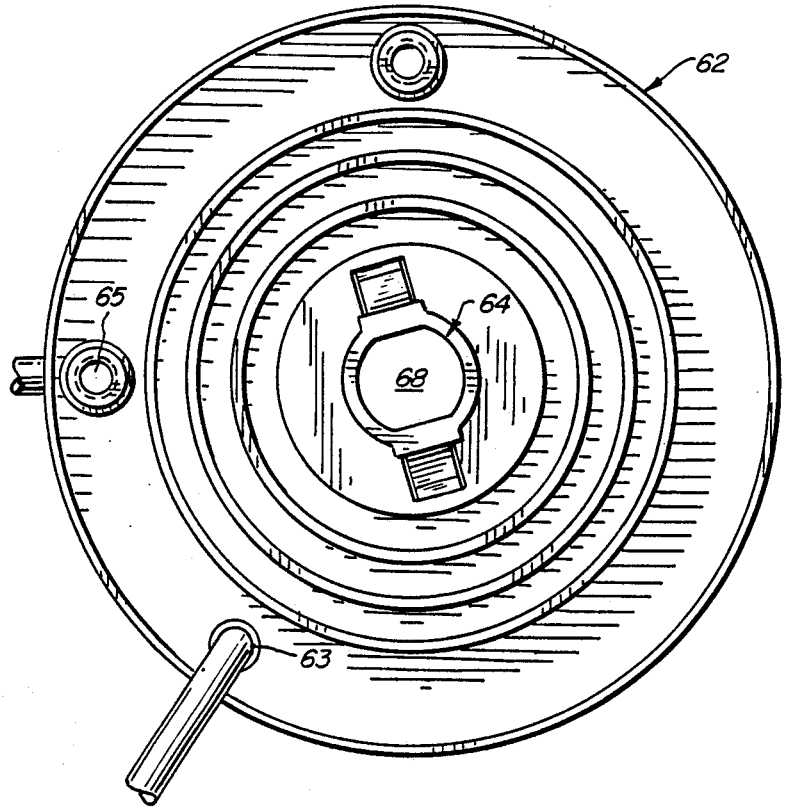
FIG. 7 is a plan view of the other side of the interconnector member of FIG. 6.
Figure 9:
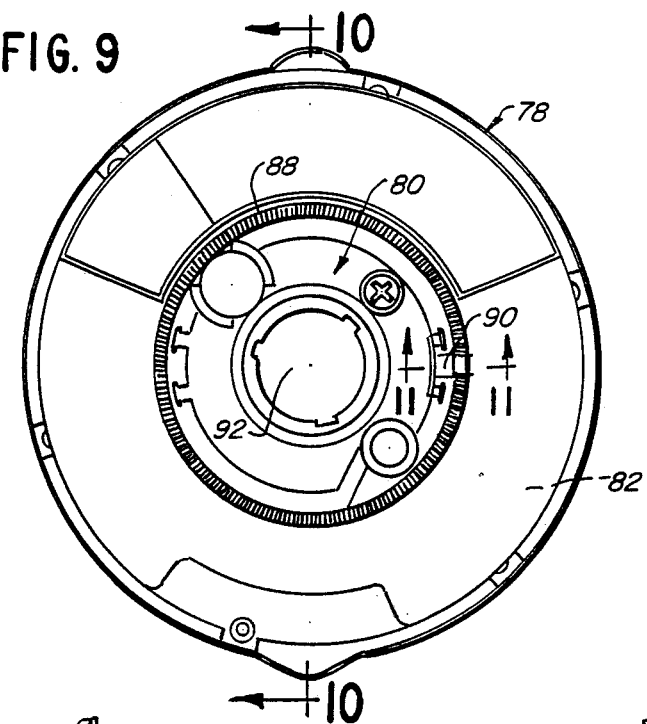
FIG. 9 is a plan view of one side of yet another embodiment of electrical interconnector member in accordance with this invention.
Figure 10:
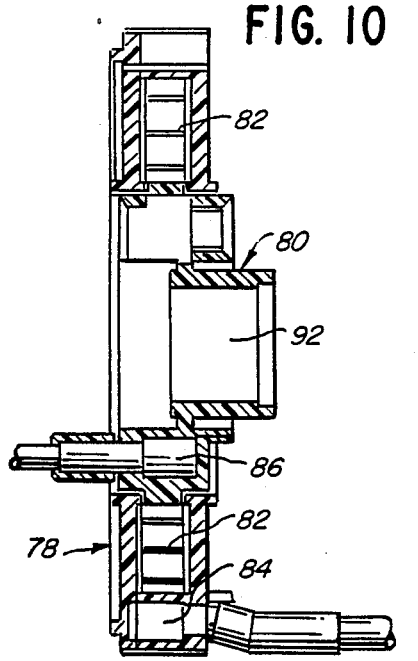
FIG. 10 is a sectional view taken along line 10—10 of FIG. 9.

Referring now to FIGS. 6 through 8, another design of interconnector member is disclosed, being of generally similar structure to the interconnector of the previous embodiment, except as otherwise disclosed herein.

As before, this interconnector defines an outer housing 62 defining a first, central aperture which carries a rotor member 64. As in the previous embodiment, coiled conductor means 66 is provided in a manner similar to the previous embodiment, being a multiple strand conductor ribbon as before, and being connected at first and second electrical connections 63,65 carried respectively on the outer housing and the rotor member in a manner similar to the previous embodiment. If desired, the connector 44 and band head 46 may be used, coupled with the folding technique as illustrated in FIGS. 5a-c.

Also as before, rotor member 64 may define a second aperture 68 which extends therethrough in generally coaxial relation with the first aperture, for receiving a portion of the steering column or the like upon which rotor 68 of the interconnector is mounted.

As before, an annular plurality of recesses 70 are provided, facing inwardly toward portions of rotor member 64. Rotor member 64 carries hinged bar members 72, positioned in the second aperture 68, the hinge being a plastic living hinge 73. Rotor member 64 also carries second hinged bar members 74 which are biased to each engage at least one of recesses 70. It can be seen from FIG. 8 that recesses 70 are not only open inwardly, but toward one side, so that second bar member 74 may pivot its outer end 75 into and out of engagement with recesses 70.

When the interconnector is mounted, with a steering column portion or the like occupying second aperture 68, the steering column portion will bias first bar members 72 into an outwardly pivoted position about hinges 73. This, in turn, forces second bar members 74 to pivot their ends 75 out of engagement with recesses 70, so that mounting of the interconnector on a steering column permits outer housing 62 and rotor 64 to be rotatable with respect to each other. Outer housing 62 is then attached to the frame of the vehicle so that the steering column may rotate, without loss of electrical interconnection of electrical apparatus on the steering column with stationary apparatus carried on the vehicle frame.

Upon removal of the interconnector from the steering column, the plastic memory of first and second bar members 72, 74 can cause them to retract toward their original position as shown in FIG. 8, in which each second bar member 74 once again engages a recess 70, to prevent rotation between housing 62 and rotor 64. Thus, during repair or maintenance of the steering column area, the interconnector is unlikely to be accidentally rotated out of its rotational position that it had upon removal, so that upon reassembly, one can know the rotational position of the interconnector and avoid the problems discussed previously which may result from accidental rotation thereof.

Turning now to FIGS. 9 through 12, another embodiment of interconnector in accordance with this invention is disclosed.

As before, an outer housing 78 and a rotor are provided, with the rotor occupying a first, central aperture in the outer housing and defining a second aperture 92 as in previous embodiments. Coiled conductor means 82 are present, as before, being respectively connected at the ends of the coiled conductor by first and second electrical connections 84, 86, which may be of a design as previously disclosed.

In this embodiment, a ring of recesses 88 are carried on outer housing 78 to surround rotor 80 and to face in an axial direction. In this embodiment, the flexible detent comprises a spring metal strip member 90 as shown in detail in FIGS. 11 and 12. Stip 90 resides in the second aperture 92 of rotor 80.

Figure 11:
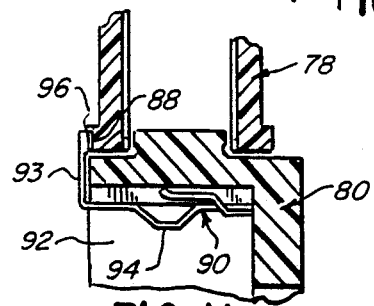
FIG. 11 is a fragmentary sectional view taken along line 11—11 of FIG. 9.

Strip member 90 defines an extension 93 that extends out of second aperture 92 and is normally biased to cause a projection 96 carried, on extension 93, to engage at least one of recesses 88. Thus, under normal circumstances as shown in FIG. 11, rotation between outer housing 78 and rotor 80 is resisted, although this structure may be designed to permit rotation with an audible detent click sound so that, if desired, the interconnector may be deliberately rotated while in unmounted condition.

Figure 12:
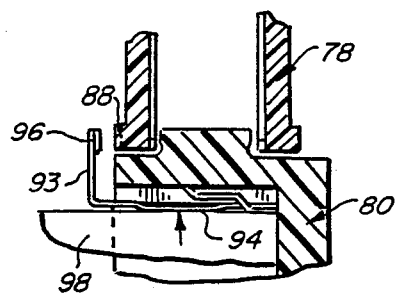
FIG. 12 is a sectional view similar to FIG. 11, showing the configuration of the interconnector member when mounted on a steering column.

Strip member 90 also defines an inwardly extending loop section 94. Accordingly, as shown in FIG. 12, when a steering column or the like 98 enters second aperture 92 as the interconnector is mounted, loop section 94 is collapsed as shown, causing axially outward movement of extension 93, to cause disengagement between projection 96 and recess 88. Thus, while mounted on steering column 98, outer housing 78 and rotor 80 are freely rotatable with respect to each other. However, when once again removed from steering column 98, strip member 90 can once again assume its original configuration as shown in FIG. 11, to once again lock outer housing 78 and rotor 80 into a rotation-resisting configuration.

Figure 15:
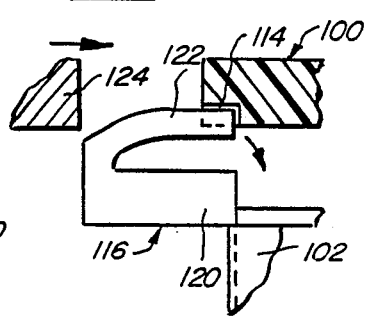
FIG. 15 is an enlarged, detailed view of a portion of FIG. 14.
Figure 13:
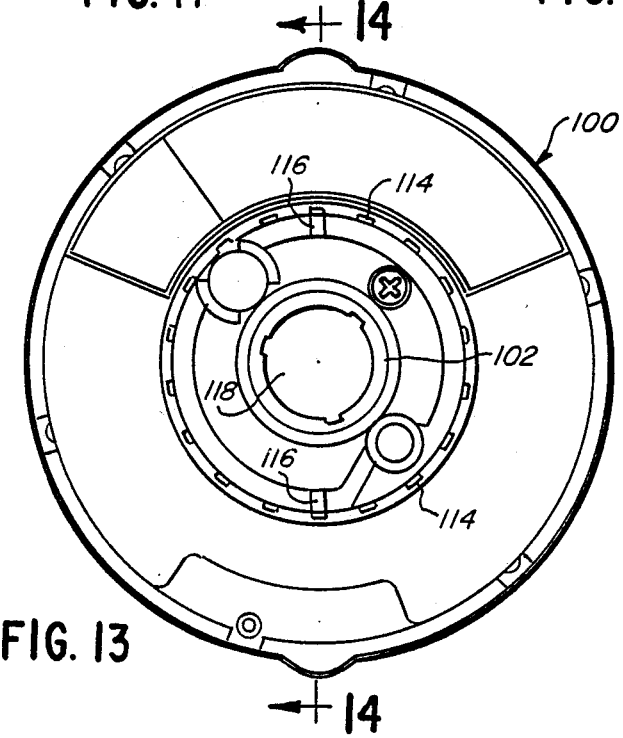
FIG. 13 is a plan view of one side of yet another embodiment of electrical interconnector member in accordance with this invention.
Figure 14:
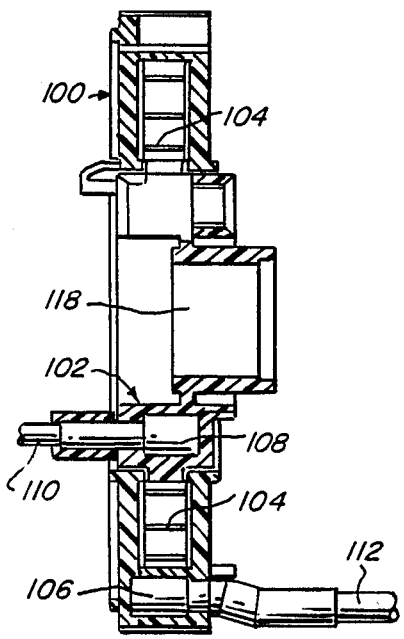
FIG. 14 is a sectional view taken along line 14—14 of FIG. 13.

Turning to FIGS. 13 through 15, yet another embodiment of the invention of this application is disclosed.

Here also, the interconnector of this invention comprises an outer housing 100 and a rotor 102, being interconnected as before with a coiled conductor 104 which is coiled in a plurality of coils about rotor 102 and connected at its respective ends as before at first electrical connection 106 with outer housing 100 and at second electrical connection 108 with rotor 102, for conventional connection with electrical conductors 110, 112 as in previous embodiments. Thus, as before, electrical interconnection may be provided between electrical devices mounted on a steering column and stationary electrical members mounted on the frame of a vehicle.

As in previous embodiments, outer housing 100 carries a plurality of recesses 114 which face inwardly toward rotor member 102, with rotor member 102 residing in a central aperture of outer housing 100 and defining its own second aperture 118.

In this embodiment, a pair of detent means 116 are carried by rotor 102 and are each of generally U-shape in cross-section as shown in FIG. 15, comprising a pair of arm sections 120, 122. Arm section 120, as shown, is attached to rotor member 102. The other, free arm section 122 is outwardly biased by the natural shape of resilient detent 116 to engage one of recesses 114. Thus, the interconnector cannot be rotated to any great degree without arm sections 122 engaging one of recesses 114 and preventing further rotation.

However, as before, when the interconnector is mounted onto a steering column, as shown in FIG. 15, the advancing steering column 124 can engage arm section 122 to push them inwardly, out of engagement with recesses 114. Thus, the normally locked interconnector becomes unlocked, permitting free rotation while mounted on the steering column. However, upon removal of the interconnector from the steering column for repair or maintenance, resilient arms 122 can once again spring outwardly into engagement once again into a recess 114 so that further rotation between outer housing 100 and rotor 102 is prevented, to achieve the advantages described above.

Thus, by this invention an electrical interconnector is provided for electrical interconnection between electrical devices mounted on a rotating member and other electrical devices mounted in a stationary position away from the rotating member. However, rotation of the electrical interconnector member is restricted, or prevented, except when it is properly mounted in position to achieve the advantages described previously.

The above has been offered for illustrative purposes only, and is not intended to limit the scope of the invention of this application, which is as defined in the claims below.

That which is claimed is:

1. An electrical interconnector member which comprises: an outer housing defining a first aperture; a rotor member occupying said first aperture in rotational relation thereto; a first electrical connection carried on said outer housing; a second electrical connection carried on said rotor member; and coiled conductor means loosely coiled about said rotor member within said outer housing, said coiled conductor means being connected at respective ends thereof to said first and second electrical connections; the improvement comprising, in combination:

recess means carried by one of said outer housing and rotor member, and flexible detent means carried by the other of said outer housing and rotor member, said detent means being normally positioned to project into said recess means to inhibit rotation between said outer housing and rotor member when said interconnector member is not mounted on a device such as a vehicle steering column, said detent means being positioned and proportioned whereby mounting of said interconnector member for use on a device such as said vehicle steering column causes said detent means to be flexed out of projecting relation with said recess means, to permit rotation between the outer housing and rotor member.

2. The interconnector of claim 1 in which said rotor member defines a second aperture extending therethrough in generally coaxial relation with the first aperture.

3. The interconnector of claim 2 in which said recess means are carried by said outer housing and comprise a plurality of recesses facing inwardly toward said rotor member, said flexible detent means being carried on an end of said rotor member.

4. The interconnector of claim 3 which is adapted to receive a portion of said vehicle steering column in said second aperture with a flange carried on said steering column pressing said detent means in longitudinal manner to hold said detent means out of engagement with said recess means.

5. The interconnector of claim 4 in which individual detents of said detent means define a finger member connected by a plastic hinge to said rotor, said finger member carrying an integral spring extension member which abuts against an inward face of said outer housing, whereby said detent means engages said recess means.

6. The interconnector of claim 3 in which said detent means is of generally U-shape in cross-section, comprising a pair of arm sections, one of said arm sections of said detent means being attached to said rotor member and the other of said arm sections being biased by the resilience of the detent means to engage said recess means to prevent said rotation.

7. The interconnector of claim 6 which is adapted to at least partly reside in an aperture in a steering column, the sides of said aperture pressing said other arm section inwardly out of engagement with said recess means to permit said rotation.

8. The interconnector of claim 3 which is adapted to receive a portion of said vehicle steering column in said second aperture, said rotor member carrying first, hinged bar members in said second aperture, said rotor member carrying second, hinged bar members which are biased to engage at their outer ends said recess means, said recess means being open to one side as well as inwardly, whereby said steering column, when present, biases said first, hinged bar members to press said second, hinged bar members out of the open one side of the recess means and out of engagement with said recess means to permit rotation between said outer housing and rotor member.

9. The interconnector of claim 2 in which said recess means are carried on said outer housing and comprises a ring of recesses surrounding said rotor and facing in an axial direction, said flexible detent means comprising a spring metal strip member residing in said second aperture, said strip member comprising an extension that extends out of said aperture and is normally biased into engagement with at least one of said recesses to resist rotation between said outer housing and rotor member, said strip member also defining an inwardly extending loop section, whereby a steering column entering said second aperture may collapse said loop section to cause axially outward movement of said extension out of engagement with said recesses.

10. The interconnector of claim 2 which is adapted to receive a portion of a vehicle steering column in said second aperture, said rotor member carrying first hinged bar members in said second aperture, said rotor member also carrying second hinged bar members which are biased to engage at their outer ends said recess means, said recess means being open to one side of said interconnector whereby said steering column, when present, biases said first, hinged bar members to press said second, hinged bar members out of the open one side of the recess means and out of engagement with said recess means to permit rotation between said outer housing and said rotor member.

11. The interconnector of claim 1 in which said coiled conductor means comprises a plurality of parallel conductor wires bonded together in a band of unitary, flexible insulation with the wires positioned in coplanar relation.

12. The interconnector of claim 11 in which at least one end of said band defines a slit in said insulation between two of said conductor wires and parallel thereto, said slit terminating short of the other end of said band, to form a pair of half band portions joined together at said one end, one half band portion being folded to lie substantially on top of the other, and means for providing electrical connection with the ends of said conductor wires.

13. The interconnector of claim 12 in which at least one end of said band carries a series of relatively thick members, said members being in relatively hinged relation to each other, whereby said one end of the band is flexible to form arcs of varying curvature but cannot be folded into a sharp, 180 degree fold.

14. An electrical interconnector member which comprises: an outer housing defining a first aperture; a rotor member occupying said first aperture in rotational relation thereto; a first electrical connection carried on said outer housing; a second electrical connection carried on said rotor member; and coiled conductor means loosely coiled about said rotor member within said outer housing, said coiled conductor means being connected at respective ends thereof to the first and second electrical connections; the improvement comprising, in combination:

recess means carried by said outer housing and flexible detent means carried by the rotor member, said detent means being normally positioned to project into said recess means to inhibit rotation between said outer housing and rotor member when said interconnector member is not mounted on a device such as a vehicle steering column, said detent means being positioned and proportioned whereby said mounting of said interconnector member for use on a device such as said vehicle steering column causes said detent means to be flexed out of projecting relation with said recess means, to permit rotation between the outer housing and rotor member, said recess means comprising a plurality of recesses facing inwardly toward said rotor member.

15. The interconnector of claim 14 in which said detent means defines individual detents which each define a finger member connected by a plastic hinge to said rotor, said finger member carrying an integral spring extension member which abuts against an inward face of said outer housing, whereby said detent means engages said recess means.

16. The interconnector of claim 14 which is adapted to receive a portion of said vehicle steering column; first, hinged bar members carried by said rotor member, said rotor member also carrying second, hinged bar members which are biased to engage said recess means whereby said steering column, when present, biases said first hinged bar members to press said second hinged bar members out of the recess means to permit rotation between said outer housing and said rotor member.

17. The interconnector of claim 14 in which said coiled conductor means comprises: a plurality of parallel conductor wires bonded together in a band of unitary, flexible insulation with the wires positioned in coplanar relation.

* * * * *